US005730816A

United States Patent [19]

Murphy

[11] Patent Number: 5,730,816
[45] Date of Patent: Mar. 24, 1998

[54] SELECTIVE LABEL STRIPPING METHOD AND APPARATUS

[75] Inventor: William J. Murphy, South Acworth, N.H.

[73] Assignee: Imtec, Inc., Bellows Falls, Vt.

[21] Appl. No.: 506,325

[22] Filed: Jul. 24, 1995

[51] Int. Cl.$^6$ .......... B32B 31/00

[52] U.S. Cl. .......... 156/64; 156/229; 156/247; 156/361; 156/362; 156/364; 156/495; 156/497; 156/542

[58] Field of Search .......... 156/64, 229, 247, 156/361, 362, 363, 364, 495, 497, 541, 542

[56] References Cited

U.S. PATENT DOCUMENTS

| | | | |
|---|---|---|---|
| 3,736,208 | 5/1973 | Kraft et al. | 156/361 |
| 4,333,781 | 6/1982 | Meulenberg | 156/361 X |
| 4,397,709 | 8/1983 | Schwenzer | 156/361 X |
| 4,931,127 | 6/1990 | Matsumoto | 156/361 |
| 5,229,587 | 7/1993 | Kimura et al. | 156/DIG. 48 |
| 5,232,539 | 8/1993 | Carpenter et al. | 156/361 X |
| 5,264,066 | 11/1993 | Lundell | 156/361 |

*Primary Examiner*—David A. Simmons
*Assistant Examiner*—Paul M. Rivard
*Attorney, Agent, or Firm*—Stephen G. Matzuk

[57] ABSTRACT

A method and apparatus for selecting labels disposed on a moving web and stripping and retaining the stripped labels apart from the web, and removing the unstripped labels with the web. The invention includes moving the unstripped labels on the web over an edge substantially parallel to the trailing edge of the label, and subsequently moving and/or rotating the trailing edge with respect to the edge at a rate relatively faster than the web to effect a reliable separation of the label from the web.

10 Claims, 13 Drawing Sheets

SELECTIVE LABEL STRIPPING METHOD AND APPARATUS

BACKGROUND OF THE INVENTION

Various means for encoding information on devices such that this information can be machine read at a future time in order to affect some process have become extremely important in all fields of endeavor. Universal Package Codes (UPC) labels on manufactured goods permit inventory control, point of sale reckoning and reorder systems that were unthinkable a few years ago. Many other code systems and applications have been devised since the start of bar code labelling.

Some applications, such as UPC, lend themselves to using relatively large bar codes that can be preprinted as part of the labelling process. The need for extensive quality control of the printed label per se is not overwhelming, since the generic rather than the individual product is what is being coded, the codes are large and readily forgiving when reading them and in general will fail by non-read rather than misread. Further, the consequences of a single failure to read are minor.

In other applications the information coded can be specific to the individual device, for example a serial number, part number and revision level, etc., where the item being labelled might be relatively expensive. Further, the information on the label might be used to control an automatic process further downstream from where the label is applied. The consequences of a mislabelled or improperly labelled device can be severe.

This problem becomes particularly acute in such areas as labelling printed circuit cards, in that with the ever increasing pressure to reduce size, the real estate on the board available for the label is shrinking, while the demand for more information is on the rise. This has the consequence that the label gets smaller and the information density goes up. Needless to say, this makes the labels harder to read and puts even more emphasis on the need to have labels that are as close to perfect as possible before they are applied. Heretofore, the only really reliable method of being sure that the label is correct and readable is to machine scan it prior to applying it. If the label does not scan or does not scan properly, the relabelling process significantly interferes with the production of goods.

Concurrent with the emphasis on real estate consumed is a similar emphasis on the accuracy with which the label is placed on the object to be labelled. Current requirements call for placement accuracies in the order of a few mils, which is seldom achievable manually.

A further complication is that the labels are often applied at the beginning of a manufacturing process, and as such must be able to withstand the environment of all subsequent processes and still be readable. For instance, in printed circuit card manufacture, these processes can be quite harsh. Solder reflow temperatures in excess of 450° F. and solvent washing are common steps to which the label is subject.

SUMMARY OF THE INVENTION

Accordingly, the present invention provides a selectable label stripping method and includes apparatus for providing selectively controlled label printing and stripping of any size specifically including small labels suitable for use on printed circuit cards that will withstand high temperatures, abrasion and solvent action while maintaining machine readability. Furthermore, according to one embodiment of the present invention, the labels are printed, stripped and applied in situ as they are needed rather than preprinted elsewhere. Moreover, the apparatus of the present invention includes a label reader providing an acceptable/not acceptable output signal according to a programmable confidence degree such that discrete levels of the degree of readability can be established and met prior to accepting the label. Moreover, the apparatus according to the present invention automatically applies acceptable labels to objects. The present invention also reliably and automatically disposes labels that do not meet the aforesaid degree of readability.

BRIEF DESCRIPTION OF THE DRAWINGS

These and other features of the present invention will be better understood by reading the following Detailed Description of the Invention together with the Drawing, wherein

FIG. 4F is a further enlargement of the sequence of the embodiment shown in FIG. 4F;

FIGS. 7C, 7D1, and 7D2 are flow charts of the LBLCHRT and STRPCHRT background routines operable according to the embodiment of FIG. 7A.

DETAILED DESCRIPTION OF THE INVENTION

Figure 1:
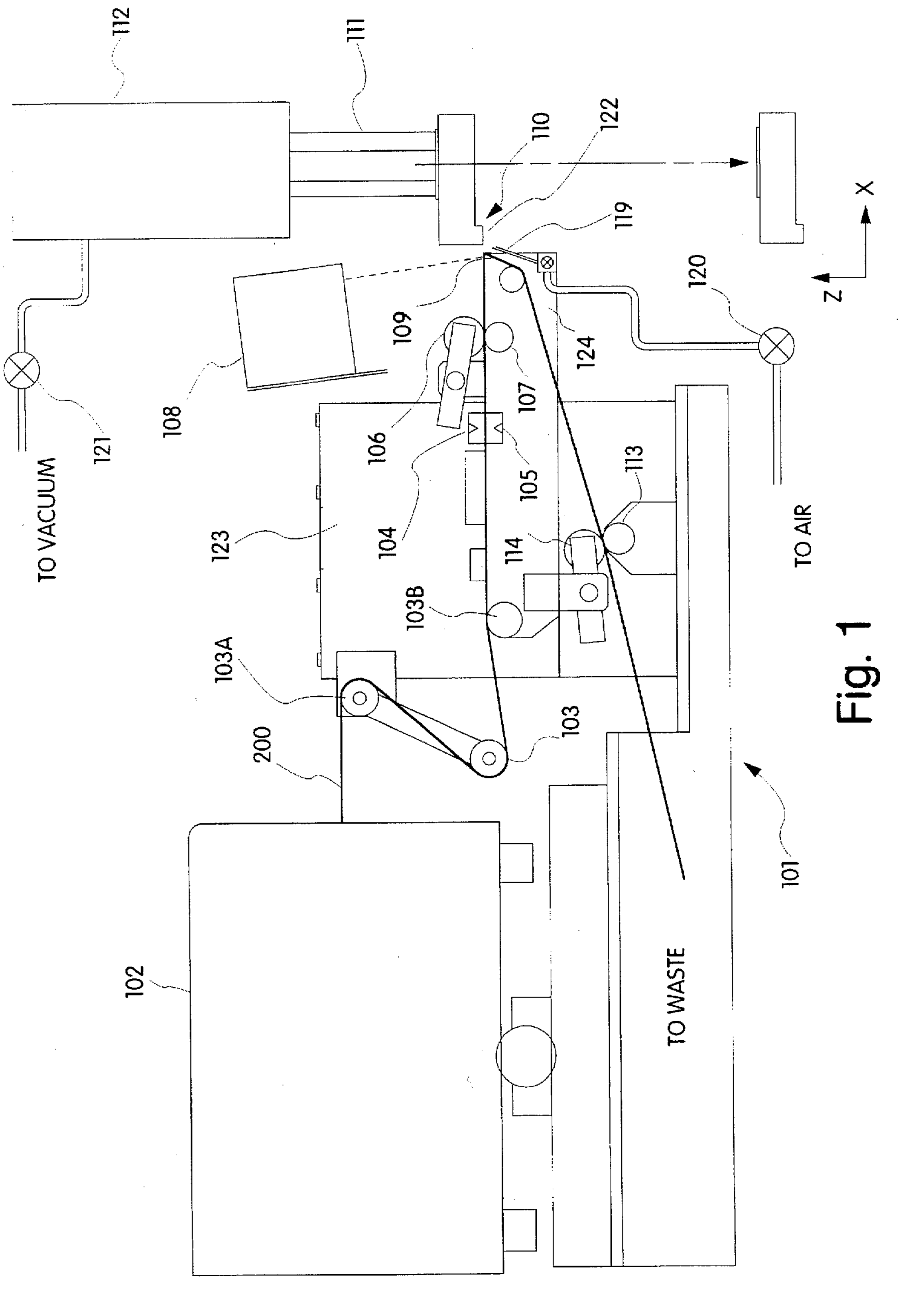
FIG. 1 is a simplified side elevation view of a preferred embodiment of out the printer stripper applicator system.
Figure 2:
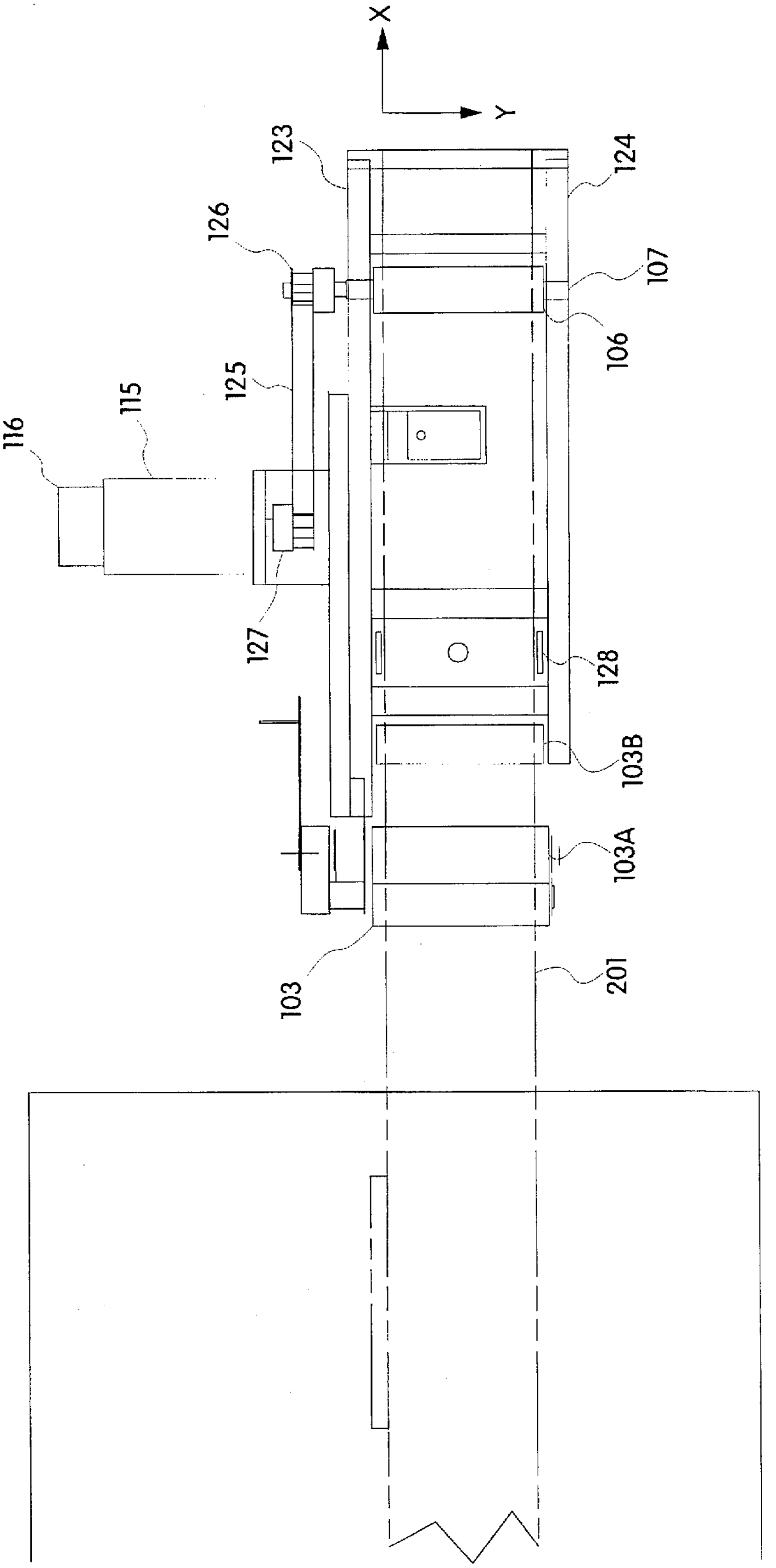
FIG. 2 is a simplified top plan view of the embodiment of the printer stripper applicator shown in FIG. 1.

Referring to FIGS. 1 & 2, the printer stripper applicator (PSA) 101 comprises a printer 102 mounted on a sliding drawer (not shown). Vertically attached to the same drawer is a plate 123 that serves to support the remainder of the components. The label stock 200 issues from the printer 102 and passes around a fixed roller 103A mounted to the plate 123. The stock 200 continues around a spring loaded dancer roller 103 and thence around a second stationary roller 103B. The stock 200 is guided by an adjustable centerline guide 128. A label sensor assembly comprising a light source 104 and a light sensor 105 mounted on opposite sides of the label stock 200 senses the optical density of the stock passing between the light source and the sensor. The stock 200 passes between a capstan 107 and a spring loaded pressure roller 106. Clockwise rotation of the capstan 107 serves to drive the stock in the positive X direction. The stock next passes around a stripper bar 109 which is supported by the plate 123 and a second plate 124. The second plate 124 is mounted to the first plate 123 by standoffs (not shown). The stock 200 then passes between a take up capstan 113 and spring loaded pressure roller 114. Counterclockwise torque on the capstan 113 serves to control the tension in the stock 200.

The drive capstan 107 is in turn driven by a DC motor 115 through a pulley 127, a belt 125 and a pulley 126 and attached to an incremental shaft angle encoder 116 which detects motion of the motor and capstan assembly. The takeup capstan 113 is directly driven by a DC motor also having an incremental shaft angle encoder to sense motion of the takeup capstan.

An applicator head 110 is attached to a vertical movable arm 111 that serves to locate the head in a vertically upward position suitable for receiving a label as shown in FIG. 1. The same arm serves to move the apply head downwards to another position suitable for pressing the label onto a receiving surface as shown by the dashed lines in the figure. Operation and control of the arm are fully disclosed in applicant's U.S. Pat. No. 5,342,461, entitled "High Speed Continuous Conveyor Printer/Applicator" which is incorporated herein by reference, wherein it is shown that label placement is by contact transfer in the instant embodiment compared to a blow-off technique in the referenced patent application.

A control valve 121 connects to an external air source not shown. A hose connects the output of the control valve to a port 122 in the applicator head through a spool valve that is operable by relative motion of the applicator head 110 with respect to the arm 111 as disclosed in the reference. In the present embodiment, the air source is a negative source or a vacuum pump. With the applicator head in its at rest position relative to the arm, the spool valve is open and air is drawn through the port 122 whenever the valve 121 is open because of the negative with respect to atmosphere pressure. When the applicator head contacts the object to be labelled in the aforesaid second position, the head 110 travels inward with respect to the arm 111, thereby closing the vacuum spool valve and opening the port 122 to atmosphere.

In an alternate embodiment, the air source is a positive source. Air flows through the spool valve and thence through a nozzle and venturi as disclosed in the reference. The venturi creates a region of negative pressure around it. The port 122 in the applicator head is connected by manifolding to the negative pressure region surrounding the venturi. This has the same effect of drawing air through the port as above, but eliminates the need for a separate vacuum pump. Upon the head traveling in with respect to the arm, the air to the nozzle and venturi is turned off by the spool valve thereby removing the vacuum applied to the port. In a further embodiment, positive air pressure is applied to the port 122 by operation of the spool valve, thus causing air to flow out of the port 122.

Returning to the present embodiment, a second control valve 120 connects to an external air source not shown. The output of this valve is connected to an array of narrow tubes 119 through a hose and a manifold. The tubes 119 are located below the strip bar aimed at the area where the label will be placed on the apply head but they are out of the path of the moving arm and head assembly. The tubes 119 are inclined at an angle of about 15 degrees off vertical as shown. Whenever the control valve 120 is open, air flows out of these tubes in a generally vertically ascendent direction.

Figure 6:
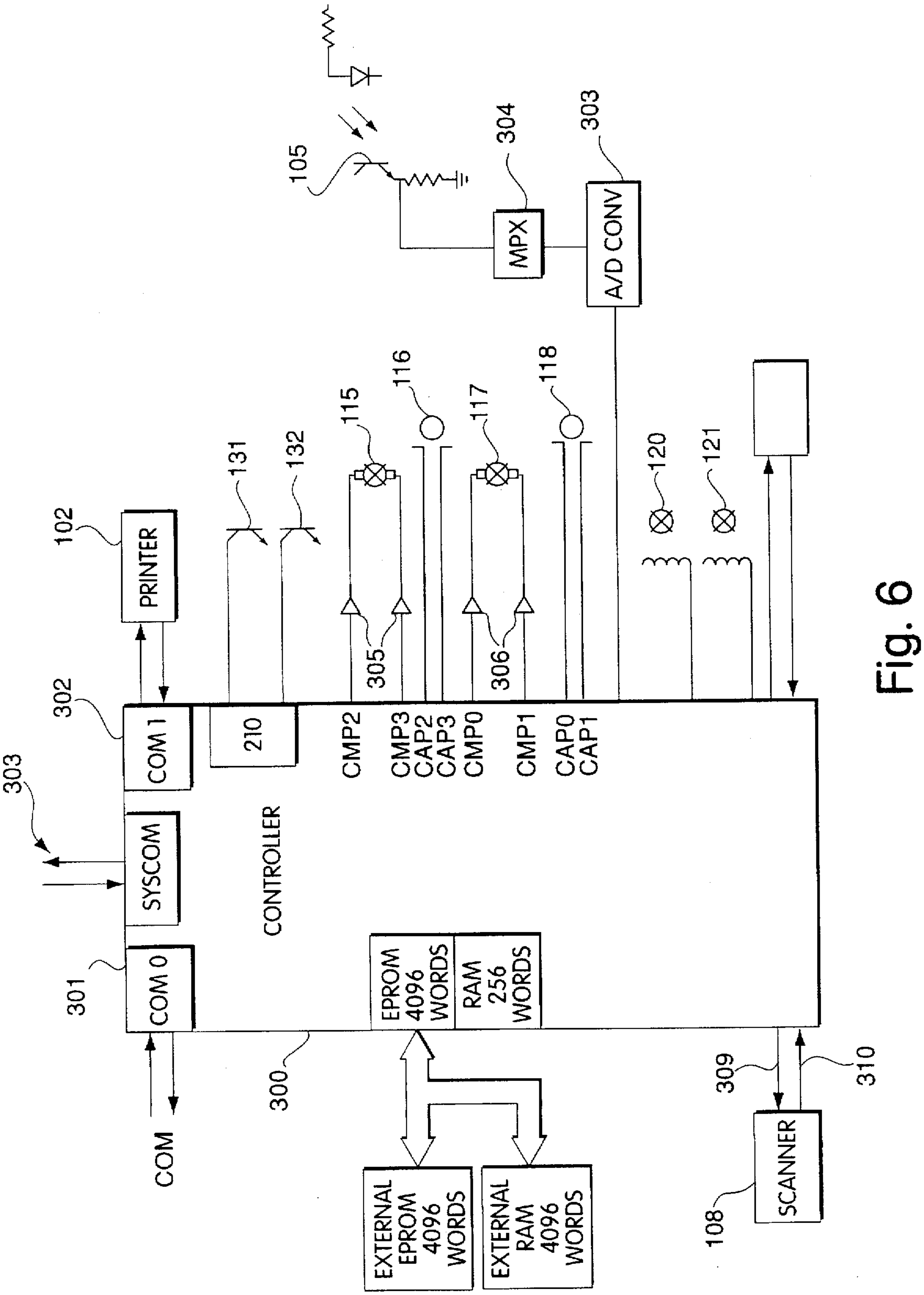
FIG. 6 is a block diagram of the controller for the printer stripper applicator for the embodiment shown in FIG. 1.

FIG. 6 is a block diagram of the controller for the PSA. The controller is a stored program microprocessor suitable for interfacing to and controlling small machinery elements such as switches, sensors and motors. In the instant embodiment, a digital signal processor such as the TMS320 manufactured by Texas Instruments is used. This processor is fully described in the aforesaid referenced patent application and in other references available in the art.

The dancer roller is fitted with two sensors that sense the limits of motion of the dancer. These sensors are digital in nature and provide signals which are brought into the processor as digital bits.

An Analog to Digital converter 303 and multiplexor 304 are interfaced to the processor. The analog output of the label sensor 105 is connected to one channel of the multiplexor.

Two compare outputs from the processor are connected to a servo amplifier 305 which in turn drives the capstan motor 115. Two other compare outputs are connected to another servo amplifier 306 which drives the takeup motor 117. The compare outputs are essentially pulse width modulators where the pulse width is calculated under program control. The program calculates the servo error, amplifies it, applies limits to it and then sets the pulse width accordingly. The compare outputs then put out a pulse of the respective duty cycle calculated for it repeatedly until assigned a new value.

The encoder 116 is mechanically connected to the capstan motor 115 and electrically connected to a pair of capture inputs on the processor. Capture inputs are inputs that respond to a transition. Each time a transition occurs, the present value of an internal clock is stored in a FIFO buffer. The program monitors these inputs, and each time a transition occurs, determines the direction of change, adjusts the present position of the motor and subtracts the present value of the clock stored in the buffer from the previous value to determine the time difference between transitions. Since the angular magnitude of a transition is a constant for any given encoder, dividing the angular magnitude by the time difference gives the angular velocity of the motor. The takeup encoder is similarly interfaced to another pair of capture inputs.

As shown in FIG. 6, small controllable scanner 108 such as a Microscan™ MS500 scan head operating in conjunction with a Microscan MS3000 decoder is interfaced to the processor. A control line 309 that is under program control causes the scanner to begin processing a scanned image whenever the line is asserted and to stop processing said image when the line is negated. A response line 310 from the scanner signals when the scanner has found an acceptable image. The definition of an acceptable image is programmable within the decoder.

A communications port 301 (COMO) accepts data and commands from an external source (not shown). The printer is connected to a second communications port 302 which are generally serial data ports of the type known as RS232 but can be any kind of compatible bi-directional port. The program in the processor controls the flow of information between the external computer and the printer.

Figure 3:
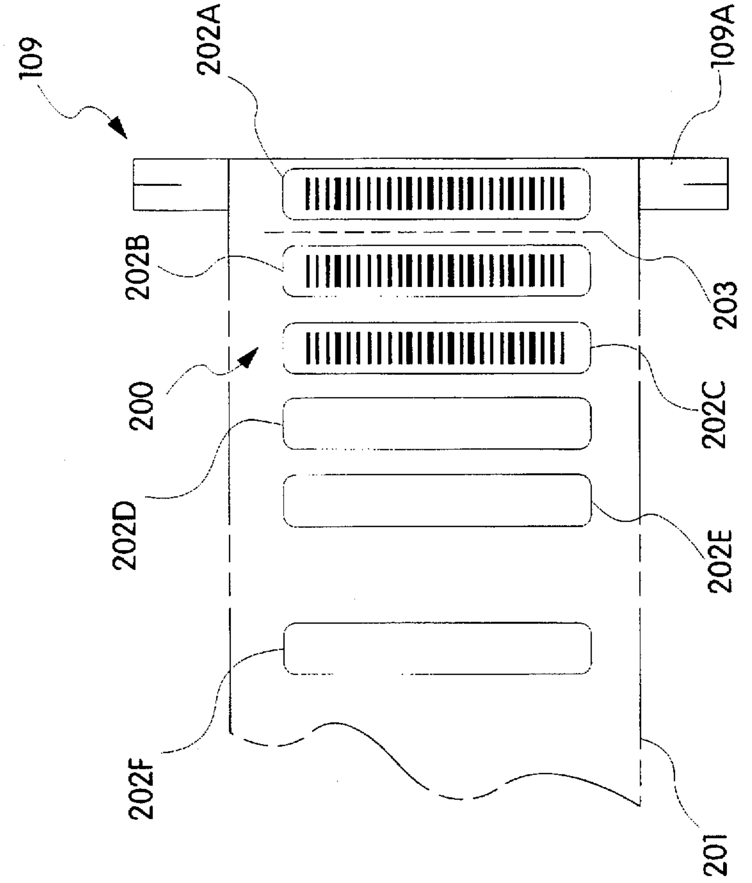
FIG. 3 is a simplified top plan view of the labels as positioned in the system of the embodiment shown in FIG. 1.

FIG. 3 is a top plan view of the label stock 200 as mounted in the stripper portion of the PSA. A liner web 201 made of paper or a similar material and coated with a release liner of silicone is positioned as shown in the figure. Labels 202A, 202B, . . . etc of a material suitable for the application that have been previously die cut with the scrap matrix removed are supplied in reel form in the printer. These labels are printed as will be explained below and then advanced in position one label at a time. Control, which is explained below, is such that, at the end of a label advancement cycle, the leading edge of the next label to be stripped 202A is positioned slightly before the strip point 109A. The beam of the scanner is positioned to trace a scan line 203 that is perpendicular to the direction of travel of the stock 200 and located a fixed distance from the strip point 109A.

Operation of the PSA is under the control of a stored program in a microprocessor. A flow chart of this program is shown in FIGS. 7A–7D and explained more fully below. A general description of the overall operation is provided first.

As shown in the block diagram of FIG. 6, the label sensor 105 measures three levels of optical density. Level 1 corresponds to the light intensity impinging on the detector with no stock between the sensor and the light source 104. Level 2 corresponds to the intensity impinging on the detector with liner 201 only between the sensor and the light source. Level 3 corresponds to the intensity impinging on the detector with both the label 202 and the liner 201 between the sensor and the light source. These levels are sampled and digitized periodically by the multiplexor 304 and the A/D converter 303 and read by the operating program of the system controller 300. There are two threshold values within the program. If the A/D converter reading is above both values, the program determines that the system is out of stock. If the said reading is between the values, the program determines that the sensor is detecting liner only. If the said reading is below both values, the program determines that the sensor is detecting a label. In practice, a hysteresis of approximately ⅛ of the value is used when changing from one state to another to prevent instability and false readings.

The DC motor 115 that drives the capstan 107 and hence the label stock 200 is controlled by the processor 300. A servo positioning system is used to drive the motor as explained in the reference. The program generates a desired position for the label stock (LBLREF). Feedback of the capstan position and hence the position of the label stock is derived from the encoder 116 which increments a counter (LBLPOS). The signal to the motor is proportional to the difference between the desired position and the actual position (LBLREF - LBLPOS), known as the position error (LBLPERR). This error signal is modified within the program to provide damping. An integrator function in the servo program guarantees that the error will go to zero. Hence the program controls label positioning by generating a new desired position and the servo causes the label stock to advance to that new position.

The servo components comprise a relatively high gain rapid response system. If the new position were put into the servo as a discrete step, the servo would respond as rapidly as possible. As will be explained more fully below, this would result in a drastic decrease in label tension, which would impede stripping. Hence the program always introduces the new position as a ramp rather than as a step. The time rate of increasing the new position to its final value does in fact determine the stock velocity and serves to control it.

The physical distance from the sensor 105 to the strip point 09A is fixed and stored in the processor in units of encoder pulses (STRPDST). When power is first applied to the PSA, the position of the label stock and the number and size of labels between the label sensor and the strip point are unknown, hence the system must be initialized. In response to a suitable stimulus (power up timer, manual switch, etc.) the program advances the stock by incrementing the desired position (LBLREF) while simultaneously monitoring the label sensor. When the program detects the first transition of the sensor from label plus liner to liner only which is by definition the trailing edge of a label, the program sets a counter (STRPCNTR) to the fixed distance (STRPDST). It also sets another counter (LBLCNTR) to zero. It further stores the value of STRPCNTR in a table (LBLTBL) and increments an input pointer. Once the first trailing edge of a label has been detected, STRPCNTR is used to limit the motion of the label stock. STRPCNTR is a decrementing counter that is operated by the shaft angle encoder 116. LBLCNTR is an incrementing counter operated by the same encoder.

The program now permits LBLREF to continue to increment at a fixed rate while it monitors the value of STRPCNTR. At the same time, it monitors the label sensor. If, as is usually the case, it sees another trailing edge of a label pass by, it stores the value of LBLCNTR in the next place in LBLTBL, increments the input pointer and resets LBLCNTR. In this way, LBLTBL contains the exact length of each label from trailing edge to trailing edge as it passes by the detector. This label detection process now operates continuously unless and until the system runs out of stock, at which point it will go through the same initialization process after the stock has been replaced. The fact that each individual label is measured from trailing edge to trailing edge means that conceptually each label can be a different size and the system will know the exact location of each label. While mixing labels of different sizes is not an ordinary case, it is not at all uncommon to have missing labels on a roll of stock. Tracking the trailing edge in this manner means that the system will handle missing labels effectively.

As the stock advances and STRPCNTR decrements, it eventually reaches a value of zero. When this occurs, the trailing edge of the first label is now just past the strip point. During the time that the label stock was being advanced initially, a low current was applied to the takeup motor 117. In addition, the two control valves 120, 121 were off. Under these circumstances, the tension in the stock 200 is at a low value and there is no deflecting air. This results in any label 202 remaining on the liner 201 as the label passes around the strip point. Hence labels controlled in this manner are not stripped but rather are passed on to waste. This feature is used to significant advantage as will be explained further.

With STRPCNTR now at zero, the LBLREF ramp is disabled, LBLREF and LBLPOS are set equal to zero, the label stock stops advancing and the advance cycle is now complete. STRPCNTR is now updated with the next label length from LBLTBL. This value is in fact the distance that the stock must be moved to bring the trailing edge of the next label past the strip point.

In the instant embodiment, the system operates in two modes, OFFLINE and ONLINE. In the OFFLINE mode, there are two control switches enabled, STRIP and MANUAL APPLY. Whenever STRIP is depressed, the system will advance one label length and always strip a label. This is accomplished as follows:

In response to STRIP, the system advances the stock one label length in exactly the same manner as described above (LBLREF ramps up, the stock advances, STRPCNTR decrements to zero, at zero the cycle ends and STRPCNTR is set to the next label length in the table) but this time the take up motor is energized with a high current value. This value causes the stock tension to be quite high, which causes the label to peel away from the liner as it comes around the strip point. In addition, the two control valves 120, 121 are energized. Valve 120 applies air to the nozzles 119 which results in a vertically directed air stream that gets under the label as it advances and forces it upwards. Valve 121 causes negative pressure to appear at the port 122.

FIGS. 4A–E illustrate the action on the label as it passes by the strip bar. In these drawings, the label is assumed to be relatively small in length, for example 0.25 inches or less. Under these conditions the length to thickness ratio is under 50:1. The label thus becomes relatively stiff along its length direction and acts more as a rigid body than a flexible film. If one attempts to strip labels of this size with ordinary means, the label will only partially strip and then snap back onto the liner. Stripping is effectively impossible. In the method described below, the stiffness properties of the label are utilized to guarantee reliable stripping.

Figure 4A:
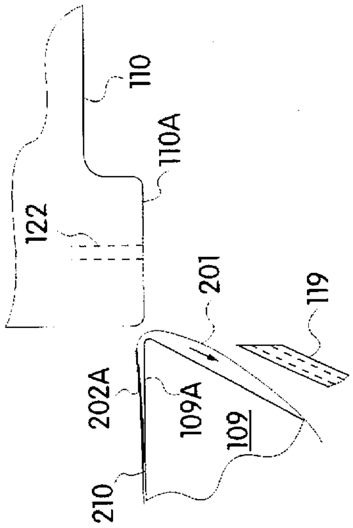
FIG. 4A–4F is a series of enlarged side views of the stripper and applicator head showing the sequence of actions that takes place during stripping of the embodiment shown in FIG. 1.

FIG. 4A shows the at rest condition in which the leading edge of label 202A is positioned just upstream of the strip bar. Low tension is applied to the liner and the liner is not moving.

Figure 4B:
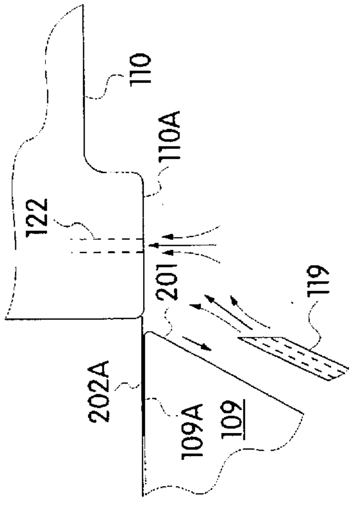

FIG. 4B shows the conditions when the label has advanced out a short distance. As the leading edge of the label passed beyond the strip bar 109, high tension was applied to the liner 201 by increasing the current to the takeup motor 117. This resulted in the liner pulling away from the label 202A, leaving the label to travel out horizontally due to its stiffness. Notice that in the embodiment shown, the apply head 110 is positioned so that its label receiving surface 110A is coplanar with the top surface 109A of the strip bar. Alternate embodiments provide the placement of the corner of the head 110 to be no higher than the top surface 109A of the strip bar 109 plus the thickness of the web and the unstripped label thereon. This results in the condition shown in FIG. 4B in which the leading edge of label 202A strikes the radiused corner of the head 110. Also note that negative air pressure has been applied to the port 122 resulting in air flow into the head through the port. Positive air pressure has been applied to the nozzles 119 resulting in the vertically directed air flow shown in the figure.

Figure 4C:
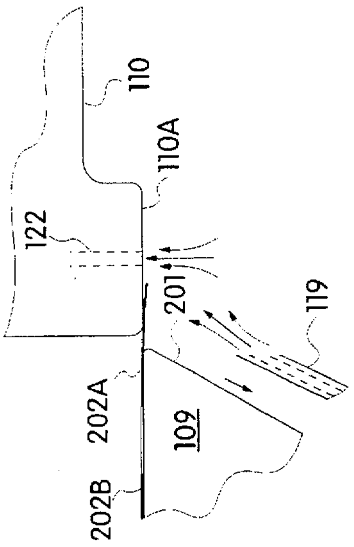

FIG. 4C depicts the condition where the label has advanced about ¼ of its length. Notice that the label is being deflected downwards by the head 110, away from the head top surface 109A. The rigidity of the label is such that it continues to travel outward and be deflected downwards. The label has entered the air stream but is essentially unaffected by it.

Figure 4D:
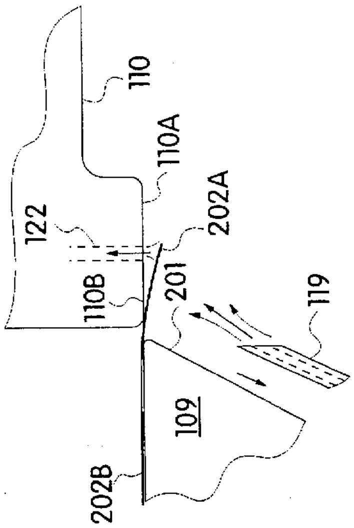

FIG. 4D depicts the state where the horizontal bottom surface (the adhesive side) of the label is still slightly in contact with the horizontal portion of the liner, but the label is now being subjected to the force of the air stream coming from the nozzles 119. The label is still traveling downwards and outward. It is somewhat affected by the air stream but its rigidity and the location of the strip point 109A relative to the apply head 110 keep it deflected downwards.

Figure 4E:
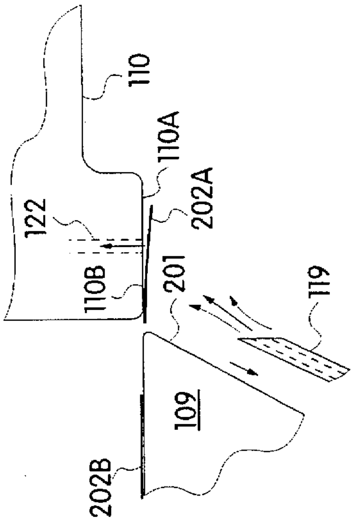
Figure 4F:
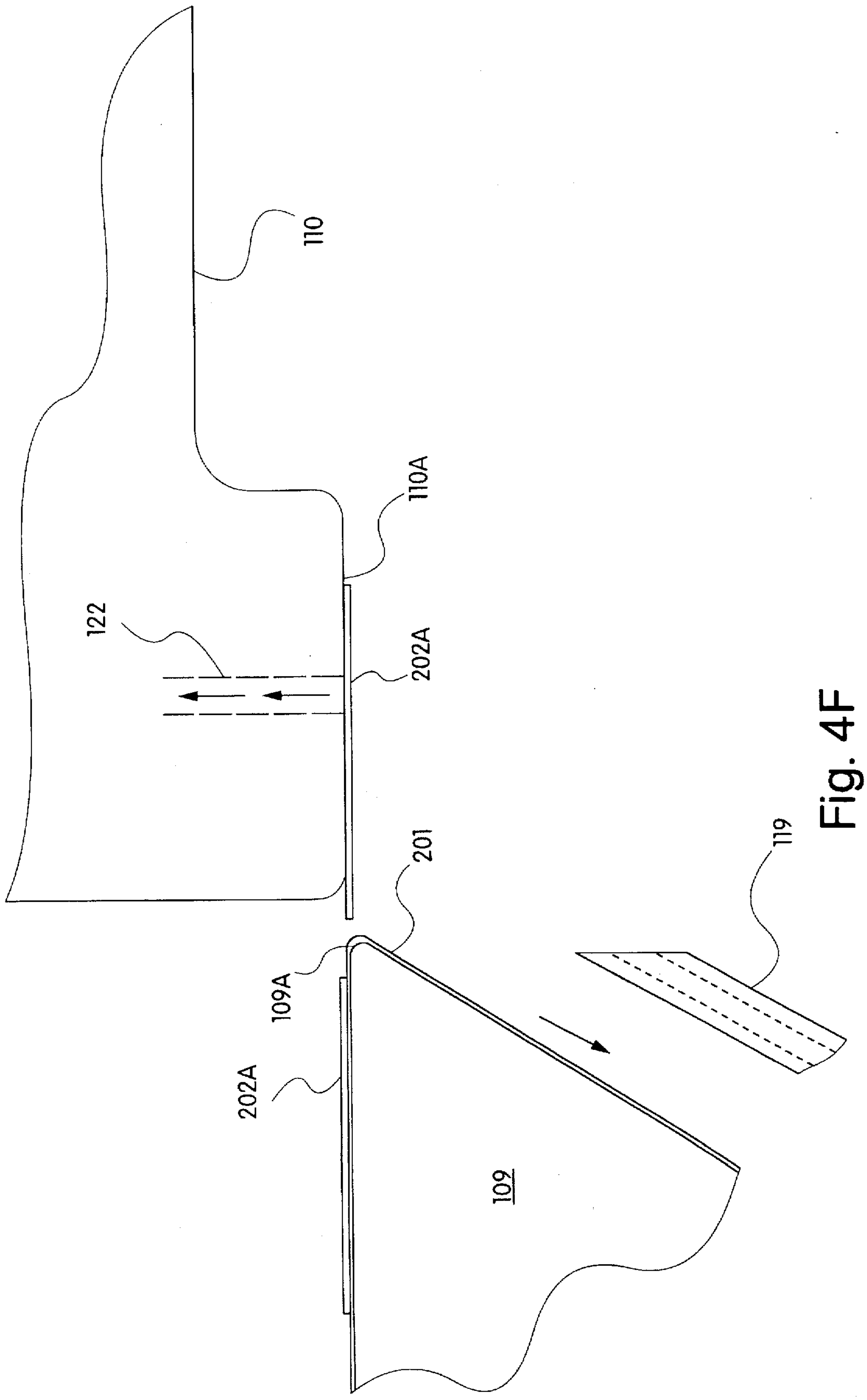
Figure 4F:
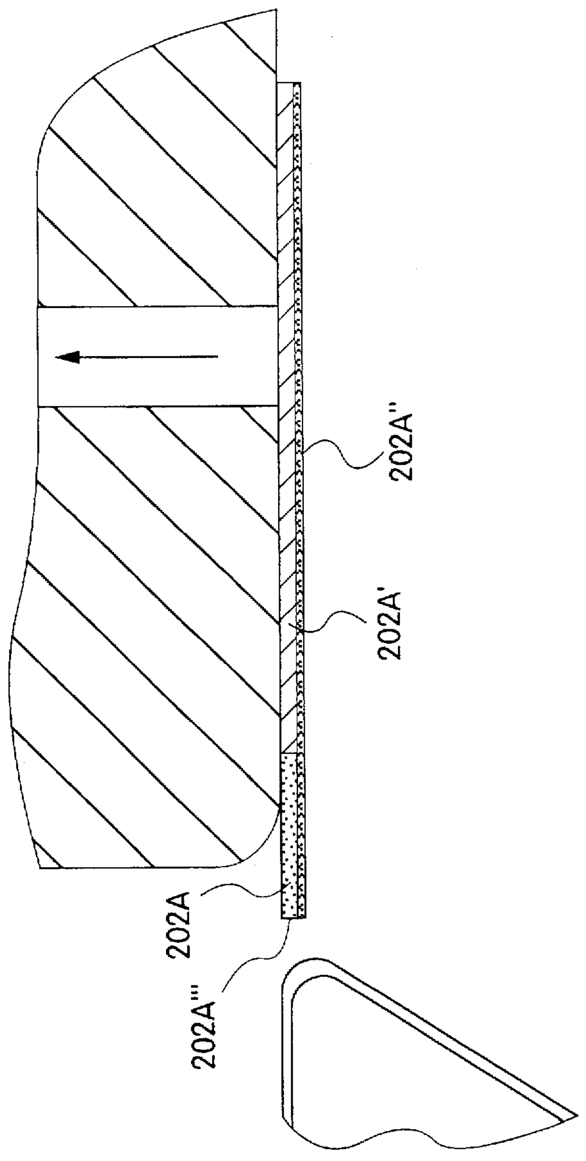

FIG. 4E shows the condition just as the trailing edge of the label rounds the point of the strip point. The adhesive force on the label holding it to the liner is reduced to a low value. The reaction to the air stream from the nozzle 119 is almost at its maximum value. This produces a moment on the label which makes it rotate counter clockwise about the contact point on the apply head 110B such that the top face of the label moves towards the apply head surface 110A. As shown in FIG. 4F, the adhesive surface 202A' of the label pulls away from the liner surface and the rotation causes the actual trailing edge **202*a*''' of the label to be adjacent to and surpass the liner at the strip point. It is this rotation which severs the adhesive link between the liner surface and the adhesive surface 202A''**. Unless this severing occurs, the label will be still somewhat bonded to the liner and application of the label will be unreliable.

Alternate embodiments provide rotation of the label (to be stripped) about an axis substantially parallel to the trailing edge of the label. This rotation moves the trailing edge of the label at a rate faster than the web liner 201 motion and the plane of the label at least at an angle substantially perpendicular to the web liner. Further embodiments may provide this relative trailing edge motion other than by rotation, such as linear movement of the label at the rate relatively faster than the web liner 201.

A very important feature of this strip down and rotate sequence is that the label placement on the head is such that the trailing edge is parallel to the strip bar 109. Its horizontal placement in the X dimension is within a few thousandths of an inch from the strip bar. Its horizontal placement in the Y dimension is determined by the guiding of the stock 200 and the location of the knives of the original tool used to die cut the label stock. Both of these parameters can be tightly controlled, resulting in placement accuracy on the head again to within very few thousandths. Since, once captured, the label is restrained from horizontal motion by the vacuum system until it is placed on the surface to be labelled, the overall placement accuracy is quite good. In the instant embodiment, placement repeatability within 2 thousandths of an inch is readily achieved.

The apply cycle is similar to that of the incorporated reference. In response to a MANUAL APPLY command, air valve 120 is turned off, thus preventing the air stream from the nozzles 119 from affecting the label 202A now on the head. The negative pressure source remains on throughout the downwards stroke of the applicator arm in order to retain the label accurately on the head. The arm is driven down by a servo motor. In the instant embodiment, the travel distance is fixed so that the arm travels to a fixed point and stops. As soon as it stops, the negative pressure is removed from the port 122. In some cases, positive pressure can be applied to this same port to insure placement of the label. In this application, it is desirable to tamp the label onto the surface of the object to be labelled (a printed circuit board) and pause momentarily to assure a secure bond of the label to the surface. The arm is then returned to its home position. The strip and apply cycles are mutually interlocked so that one cannot occur while the other is executing.

In other applications, variable stroke operation could be utilized as discussed in the reference. Various means of predetermining the stroke distance such as applicant's package height measurement means could be used. Non-contact application of the label is also possible.

In ONLINE operation, the strip and apply cycles are concatenated in response to a single control switch. In addition, a scanner is enabled over a portion of the cycle. As shown in FIG. 3, the scanner beam is adjusted so that it sweeps a line 203 perpendicular to the direction of travel of the label stock 200, although other angles of scanner beam sweep are within the scope of the present invention. In the instant embodiment, the line 203 is located such that it is midway between two adjacent labels when the labels are in their at rest position.

As the label 202A is being advanced past the strip point, the label 202B passes through the beam of the scanner. The program controls the starting and stopping of the scanner by monitoring the location of the trailing edge of the label 202B, it being assumed that the position of the encoded data on the label to be scanned is fixed in position on the label relative to the boundaries of the label. If this is not the case, other more open schemes of controlling the scanner can be provided by one skilled in the art.

The scanner in the present embodiment is essentially a fixed rate raster scanner. Each sweep of the scanner beam is decoded for a good scan. The scanner can be programmed to decode any number of sweeps before it issues a good scan status signal. If the capstan motor 115 operates at a constant velocity, the label stock advances a known distance DL for each sweep of the scanner. Knowing the height of the code H and the distance DL, then the number of good scans required is $$\#scans=H/DL \qquad (1)$$

for 100% scanning. For example assume a scan time interval of 5 milliseconds and a label velocity of 1 inch per second. Assume H=0,060 '. DL is thus 5 mils, and 100% scanning requires 12 good decodes. In practice, 100% scanning would be too stringent. A level more like 25% might be chosen resulting in 3 good scans required to pronounce the label scannable. When the required number of good scans is achieved, the scanner outputs a signal GOODSCAN 310 to the controller. Alternate embodiments include other scanning and programmable apparatus to read the label code and determine the number of acceptable scans required to provide a GOODSCAN signal to the controller 300 as shown in FIG. 6.

If the controller 300 sees a good scan signal from the scanner while the scanner is enabled, it sets a bit in the LBLTBL entry for the label being scanned. Hence, conceptually at least, the scanner can be located anywhere between the label sensor 105 and the strip point 109, provided only that scanning is accomplished prior to stripping a label and that the controller knows where the scan beam is located.

In short, as label 202A is being stripped, label 202B is being scanned. When label 202A is fully stripped, label 202B is in position to be stripped, and the LBLTBL is marked with a bit indicating whether this label was successfully scanned.

In the instant embodiment, the start of an on line cycle occurs in response to an external foot operated switch. Upon receipt of this command, the LBLTBL is queried for the state of the good scan bit once the label has advanced beyond the scanner. If true, the label is stripped out onto the head as described heretofore, and an apply cycle is automatically executed. When the arm returns home, the system awaits a new command.

If the good scan bit is false, a no strip cycle is executed. The label advancement method is identical to that described heretofore, but the tension on the liner is maintained at a low value by applying low current to the takeup motor 117. The air control valves 120 and 121 are maintained off. FIGS. 5A–5E depict the states of the label as it passes around the strip point.

Figure 5C:
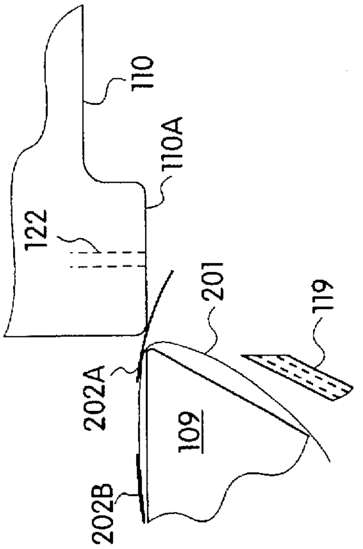
FIGS. 5A–5E is a series of enlarged side views of the stripper and applicator head showing the sequence of actions that takes place when not stripping of the embodiment shown in FIG. 1.
Figure 5B:
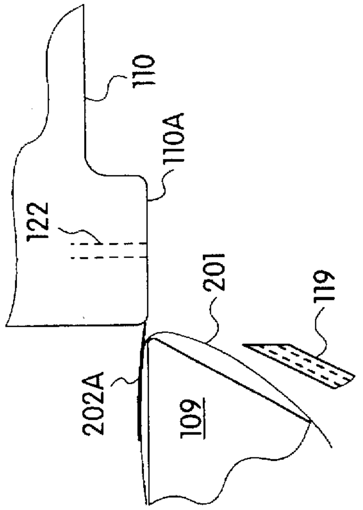
Figure 5A:
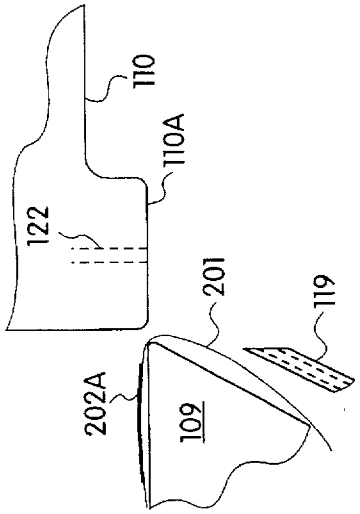

In FIG. 5A, the label is at its at rest position and tension in the liner is low. In FIG. 5B the label has advanced out to the point where its leading edge touches the head and is deflected downwards. The absence of a high takeup tension keeps the label substantially in contact with the liner.

FIG. 5C shows the label advanced about one half its length. Depending upon the tension in the liner, the liner will pull away somewhat from the adhesive side of the label due to the rigidity of the label and the radius of the liner as it passes around the strip point.

Figure 5E:
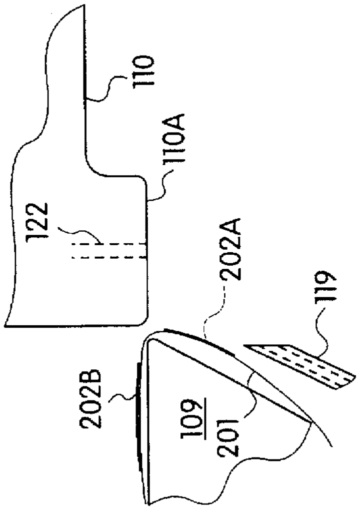
Figure 5D:
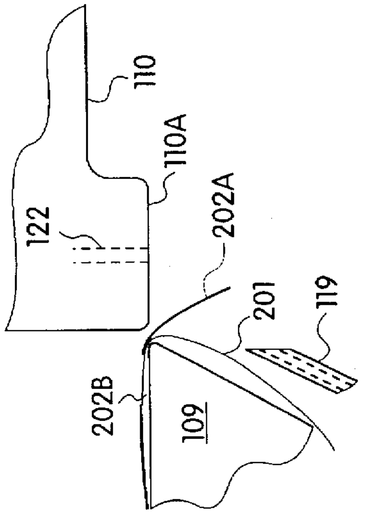

In FIG. 5D, the trailing edge of the label has reached the strip point, but the adhesive face of the label is still making significant contact with the liner. There are no opposing forces to deflect the label upwards, so the label effectively rotates downwards clockwise as the stock advances.

In FIG. 5E the stock has advanced far enough so that the label 202A and its adjacent liner portion are beyond the area of influence of the strip point and the label is effectively parallel to the liner.

In this manner, the combination of low liner tension and no uplifting forces causes the label to be predictably and reliably discarded. Hence the system described above can reliably strip and apply or discard labels in response to suitable control parameters by controlling air assist and liner tension.

As this discard sequence was under way, the scanner was still evaluating the label in its view in the same manner as discussed heretofore. Thus the table entry for the next label to be stripped has been entered during the discard cycle. Upon completion of the discard cycle for label 202A, the entry for 202B is checked. If good, a strip cycle is initiated and the process terminates upon completion of the apply cycle. If not good, another discard cycle is initiated. A limit is established on the number of successive discard cycles the system will execute before stopping and returning to the quiescent state.

Printer

The strip and apply means described above can operate with or without a printer. When used without a printer, labels are simply supplied preprinted on a roll. If the roll is small, it can simply be mounted on a free wheeling spindle. If large, the supply roll may need to be driven.

If a printer is used, a synchronizer which communicates with the controller 300 is employed to synchronize the printing of labels with the stripper/applicator. Alternate embodiments include the synchronizing of the printer in the controller 300 with corresponding programming. In the instant embodiment, there is a spring loaded dancer arm 103 that maintains tension on the label stock 200. As stock advances through the stripper/applicator, the dancer arm rotates counter clockwise. There are two limit sensors that sense when the dancer is approaching fully closed and when it is approaching fully opened. The controller 300 monitors these sensors. When the dancer closed sensor actuates, the controller sends a print command to the printer that is suitable for the printer in use. When the printer receives the print command, it prints one equivalent label. The term equivalent label means one label for the printer. Many printers available today are not capable of printing individual labels as small as required for the instant applications, so they must be programmed to print labels in batches. For example, in the instant embodiment, the printer is a thermal transfer printer as manufactured by UBI of Sweden. Its minimum label length is 0.8 inches. Therefore, this printer is programmed to print labels in batches of three.

The controller starts a timer when it sends the print command. When the timer times out, the controller checks the state of the dancer arm. If it has opened, nothing further happens until the dancer arm closes again. If it is still closed, the controller issues another print command, displays a message that the printer has not responded and stops any further label stock advancement. The controller continues to issue print commands in this manner until the dancer arm opens or the printer responds with a status message.

Figure 7A:
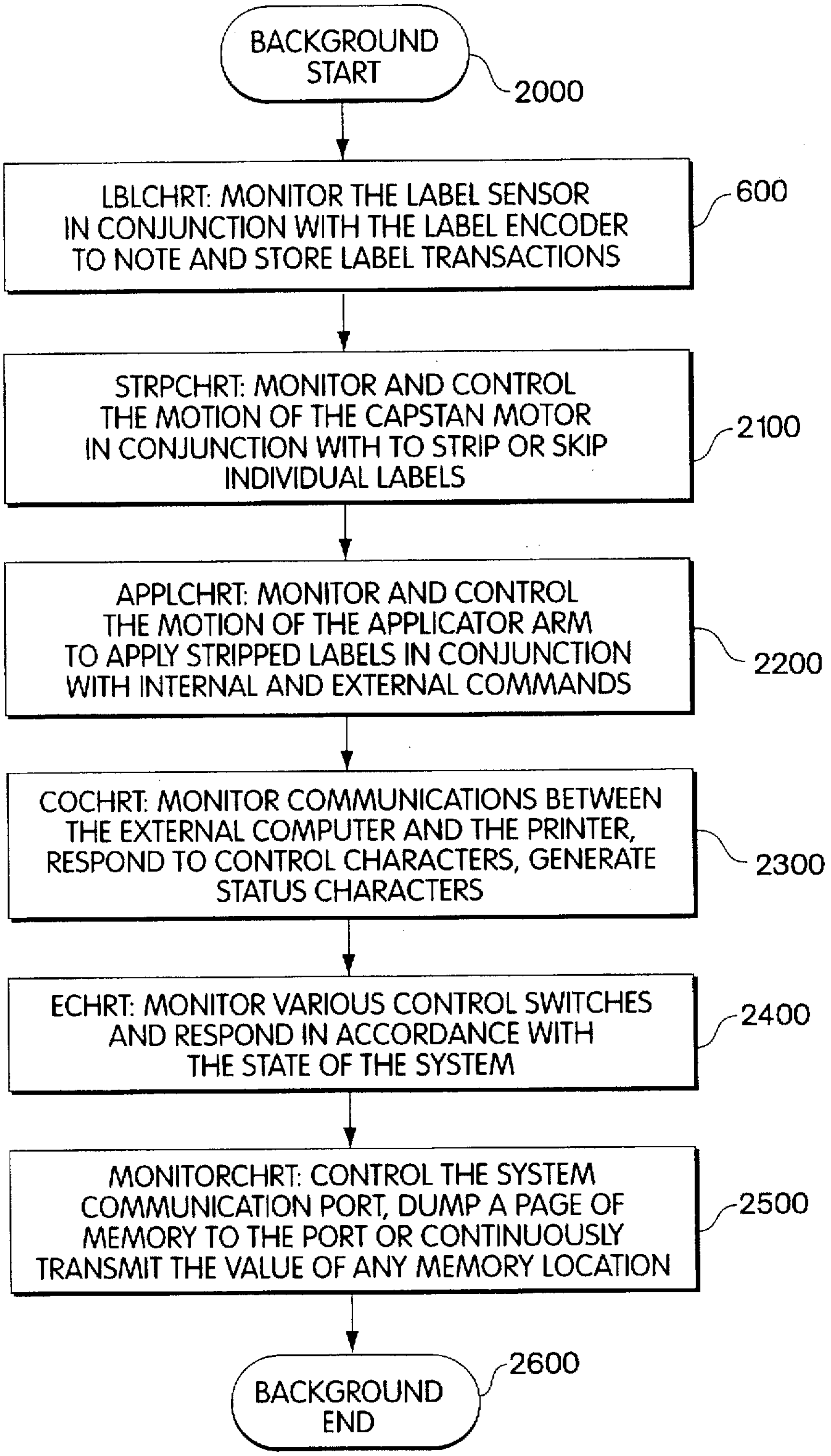
FIGS. 7A and 7B are flow charts of the background and interrupt driven foreground programs that control the printer stripper applicator according to the preferred embodiment of the present invention.
Figure 7B:
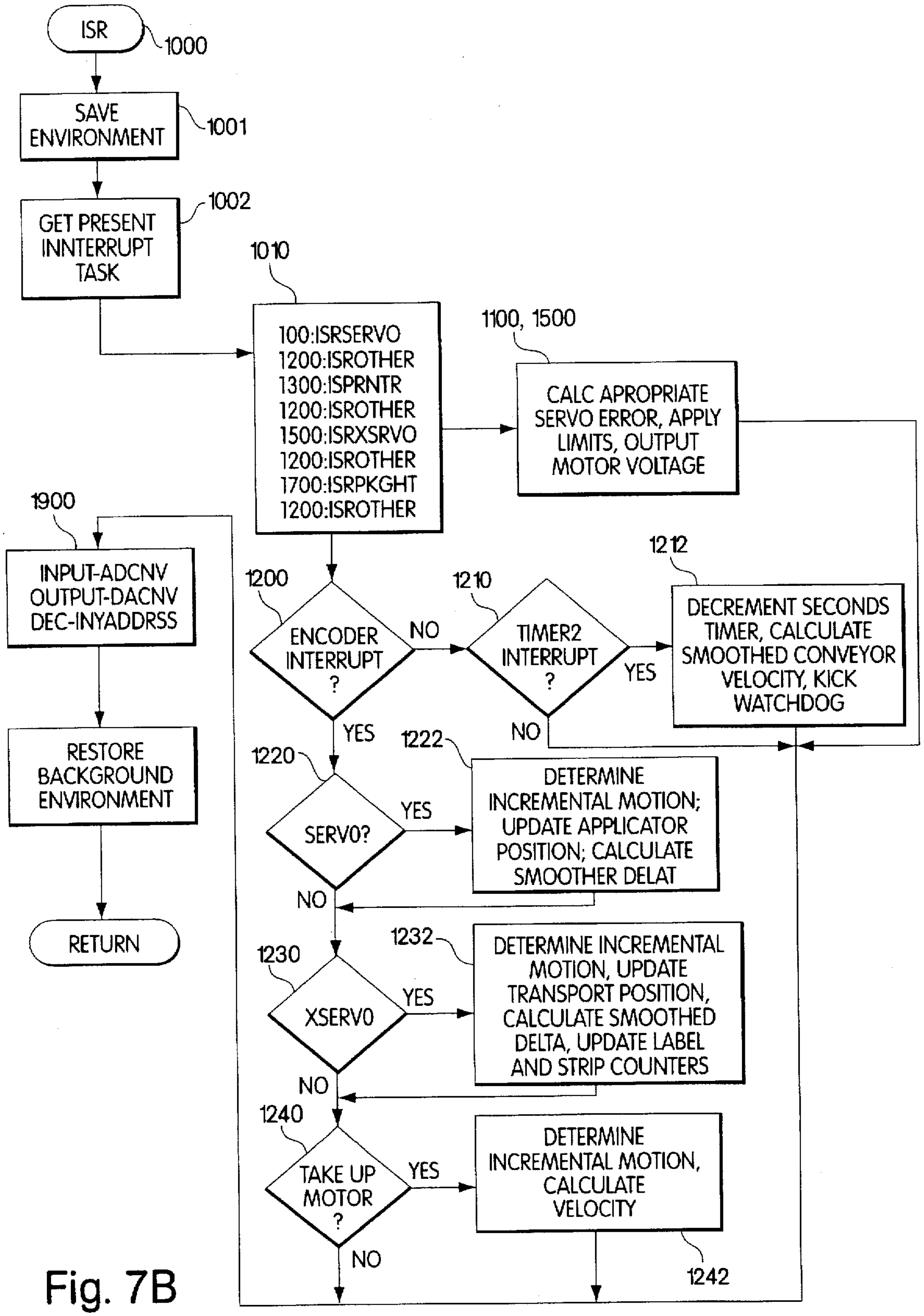
Figure 7C:
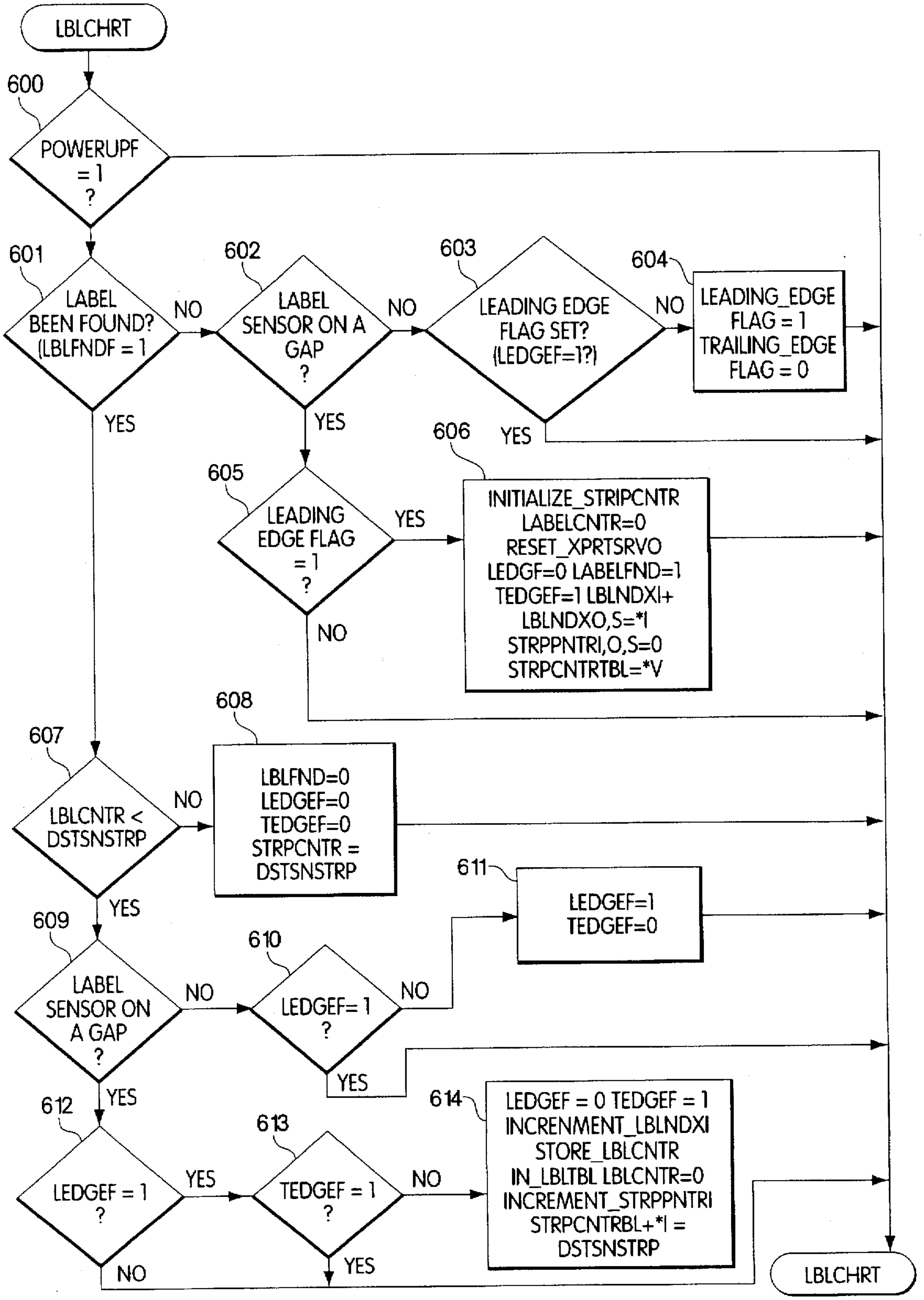

The operation of the stripper applicator is under the control of the program stored in the controller. The program executes in both the internal and external Programmable Read Only Memory (PROM) sections of the controller. FIG. 7A is a flow chart of the background program routine and FIG. 7B is a flow chart of the interrupt driven Foreground routine according to one embodiment of the present invention. The Background routine of FIG. 7A includes FIG. 7C, a detailed flow chart of the label monitoring portion of the program and FIG. 7D, a detailed flow chart of the label stripping portion of the program. Referring to FIGS. 7A and 7B, the system program operates in two distinct modes, Background and Foreground. Normally the program operates in the background mode except when it is in foreground. The foreground mode of operation, step 1000 in the figure, is interrupt driven. A timer in the processor generates an interrupt every 50 microseconds, causing background operation to be suspended and foreground operation to commence. The foreground operation is structured such that the average execution time in foreground is less than 50 microseconds, resulting in execution of both background and foreground tasks on a time shared basis. When the background program is interrupted, control transfers to step 1000, where the operating environment of the background program is saved in step 1001. A counter (INT ADDRESS) is queried in step 1002 to determine the address of the processing routine for this pass through the foreground program. This counter is used as an index to a table shown in step 1010 where various routines are stored sequentially. As shown in the step, the same routine (for example step 1200) can be entered in several places in the table, resulting in that routine being executed more than once for each pass through the table. In the instant embodiment, the counter can count 8 steps over the range of 0 to 7. It is incremented once each pass through the interrupt handler, that is, once every 50 microseconds. In this way, every interrupt routine is serviced at least once every 8*50 or 400 microseconds. Further, the interrupt routine 1200 which is entered in the table every other position is thus serviced once every 100 microseconds. Having determined the appropriate routine to execute in this interrupt cycle, the foreground program branches to it.

If the routine to be executed is step 1100 or step 1500, the program calculates the error for either the arm servo or the capstan servo respectively, setting the output pulse width to the servo amplifier as is more fully described in the cited reference. The program then branches to the foreground exit routine, step 1900.

If the routine to be executed is step 1200, the program first determines in step 1200 if any shaft angle encoder transition occurred. The TMS320 has four capture inputs defined. Capture inputs are digital signal inputs operating in conjunction with 4 element FIFO (First In, First Out) memories that monitor digital signal transitions on the inputs. Each time an individual signal changes state (from a ONE to a ZERO or a ZERO to a ONE or both, programmable in the TMS320), the value of a high speed timer is stored in the FIFO associated with that input. In addition, an Interrupt flag specific to the input is set. Up to three such transitions can occur before the FIFO must be processed. The step 1220 monitors the flags for all encoder inputs to determine if any encoder transition has occurred. If so, it branches through the step 1220 where it determines if the servo encoder had a transition. If so, at step 1222, it determines the direction of the transition and updates the present position of the applicator arm. It further determines the time difference between this transition and the prior transition by subtracting the previous value of the high speed timer from the present value of the timer for this position as read from the FIFO. This time difference is used to calculate the velocity of the encoder, the calculation being the incremental distance per signal transition of the encoder divided by the time difference between signal transitions of the encoder. The previous value of the high speed timer is then updated to be the value presently read from the FIFO so as to prepare for the next signal transition. The FIFO is then checked to be sure multiple transitions are not stored therein. If more than one transition did occur, then it is processed as described above until the FIFO is determined to be empty. In practice, it is seldom that multiple encoder events on any one line take place in any given pass through the encoder routines, since the sampling rate of the encoder routine is made deliberately high (once every 100 microseconds or 10,000 times per second). The same types of routines as described above take place in steps 1232 for the transport motor and steps 1242 for the take up motor, when transport motor and take up motor encoder transitions are detected at steps 1230 and 1240, respectively. The program then branches to the foreground exit routine, step 1900.

If in step 1200 it was determined that no encoder event took place, the program tests in step 1210 to see if a second timer (TIMER2) timed out. This timer is a 25 msec timer that is used for clocking various other low resolution timers in the program. If so, at step 1212, it then decrements any active low resolution timers as well as triggering a watchdog timer. The watchdog timer is a hardware device that will disable all servo systems if it ever times out. It is a safeguard designed to protect the servo systems from a possible program failure. The program then branches to the foreground exit routine, step 1900. In step 1900, the program reads the value from an analog to digital converter and stores this value in a table indexed by the interrupt counter (INT ADDRESS). It also outputs the contents of a memory location selected by the monitor chart described below to a digital to analog converter, following which it decrements the interrupt counter (INT ADDRESS). The interrupt counter value is then output to an analog multiplexor to select the new analog value to be converted by the analog to digital converter at the next interrupt. The program next restores the operating environment of the background program and returns to the background program.

The background program consists of 6 major segments that are executed in succession. Referring to FIG. 7A, these are listed as LBLCHRT (600), STRPCHRT (2100), APPLCHRT (2200), COMCHRT (2300), ECHRT (2400), and MONITORCHRT (2500). When the background program advances to the final step 2600, it then loops back to the starting point 2000. In this way, each of the major segments of the program is executed once per pass through the program. The foreground timer interrupts described above can occur at any place in the background program. When they do, execution of the background is suspended at the point of the interrupt until the foreground section is complete, whereupon the background execution is resumed.

LBLCHRT (600) and STRPCHRT (2100) relate directly to the subject matter of this invention and are discussed in detail below. The remaining segments are discussed here in less detail. APPLCHRT (2200) is the program segment that controls the operation of the apply system. This segment is fully disclosed in the cited reference. COMCHRT (2300) is the program segment that controls communications between the printer and an external source of data such as a computer. It sends status and error messages to the external computer and controls data flow to the printer. This segment is general in scope and not discussed further. ECHRT (2400) is a program segment that performs general housekeeping functions such as interfacing to control switches and sending output information to various indicators and a 16 character display. This segment is general in scope and not discussed further. MONITORCHRT (2500) is a diagnostic utility that operates continuously as a part of the operating program. It communicates with an external device such as a computer over a separate RS232 communications link assigned as the system monitor port. This segment of the program will immediately transfer (DUMP) the contents of any of the 16 pages of external Random Access Memory upon request from the external device. A page is defined as 256 16 bit words. Page 0 is a map of the internal RAM of the TMS320 processor. The rest of the external RAM is used as buffers and data tables. This technique thus permits a snapshot examination of any portion of RAM memory. For example, one page is set aside as a communications buffer for data from the external computer. Dumping that page allows one to examine the actual character string sent to the applicator system from the computer. Dumping Page 0 allows one to investigate all the TMS320 memory registers. This information is valuable in debugging and troubleshooting system problems. A second feature of MONITORCHRT allows any individual memory location in Page 0 to be transmitted continuously (WATCH) over the system monitor port. The current value of the selected location is repeated every 20 msec. This message can be displayed on an external computer as a single line entry which changes only in value, not position on the screen. In addition, the contents of whatever address is requested to be transmitted in this manner will also be sent out to the Digital to Analog converter every time the foreground program executes. The analog output of the D/A converter can be examined with an external oscilloscope thus permitting real time active viewing of the state of any TMS320 memory register. This feature is also extremely useful for debugging and troubleshooting.

LBLCHRT (600) provides the software means for measuring labels and tracking them through the system. A flowchart for this segment is shown as FIG. 7C. Referring to this Figure, the program determines in step 600 if the power up sequence is over. If not, it exit to segment 2100. If so, it determines in step 601 if a valid label has already been found. If not, it determines in step 602 if the sensor is looking at liner alone (gap) or liner plus label stock. If not on a gap, it determines in step 603 if an internal leading edge flag has already been set. If so, it exits. If not, it sets an internal leading edge flag and clears an internal trailing edge flag, at step 604. If the result of step 602 is that the sensor is on a gap, the program then determines in step 605 if an internal leading edge flag is set. If not, indicating that no valid label has yet been found, it exits from the chart. If so, indicating that a valid trailing edge transition has just been made, in step 606 the program initializes the strip control counter STRIPCNTR to a value equal to the distance from the label sensor to the strip point DSTSNSSTRP, sets the label length counter LBLCNTR to zero, sets the transport servo control registers XPTRREF and XPRTPOS to zero, sets the label found flag to 1, sets the trailing edge flag to 1, clears the leading edge flag, increments the input label index register, sets the output and scan label index registers to be the same as the input register just incremented, clears the input, output and scan strip pointers and initializes the strip counter table with DSTSNSSTRP. The program then exits from the chart. The counters and registers are operated from the foreground program. Referring back to FIG. 7B, each time the label stock advances one increment of motion, in step 1232 the STRPCNTR and the strip counter table are all decremented by one and the LBLCNTR and XPRTPOS register is incremented by one.

Returning to FIG. 7C, if in step 601 the program determines that the label found flag is set, it then determines in step 607 if LBLCNTR has exceeded DSTSNSSTRP, indicating that no valid trailing edge has been found in this distance since the first determination was made. This implies a label length greater than this distance requiring the system to be re-initialized, which the program does in step 608 by clearing the label found, leading edge and trailing edge flags and initializing the strip counter to DSTSNSSTRP. If step 607 determines that LBLCNTR is less than DSTSNSSTRP, the program determines in step 609 if the label sensor is on a gap. If not, the program determines in step 610 if the leading edge flag is set. If so, it exits the chart. If not, step 611 sets the leading edge flag and clears the trailing edge flag before exiting the chart. If step 609 determines that the sensor is on a gap, the program then determines in step 612 if the leading edge flag is set. If not, it exits the chart. If so, it determines in step 613 if the trailing edge flag is set. Is so, it exits the chart. If not, step 614 sets the trailing edge flag, clears the leading edge flag, increments the label input index, stores the contents of the label counter in the label table address specified by the input index, sets the label counter to zero, increments the strip counter table input index, and initializes the counter specified by input index to DSTSNSSTRP.

Figures 1, 7D:
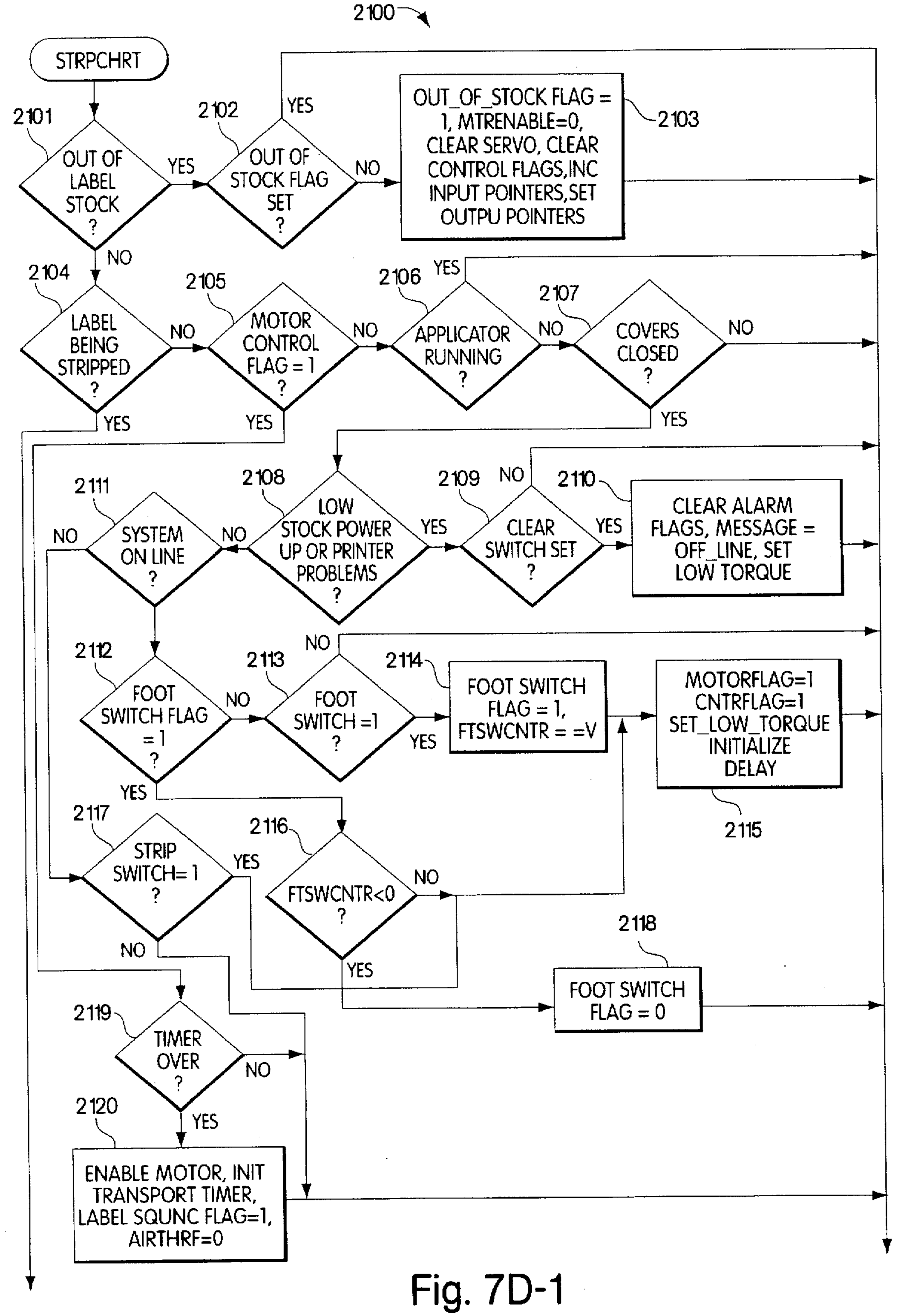
Figures 2, 7D:
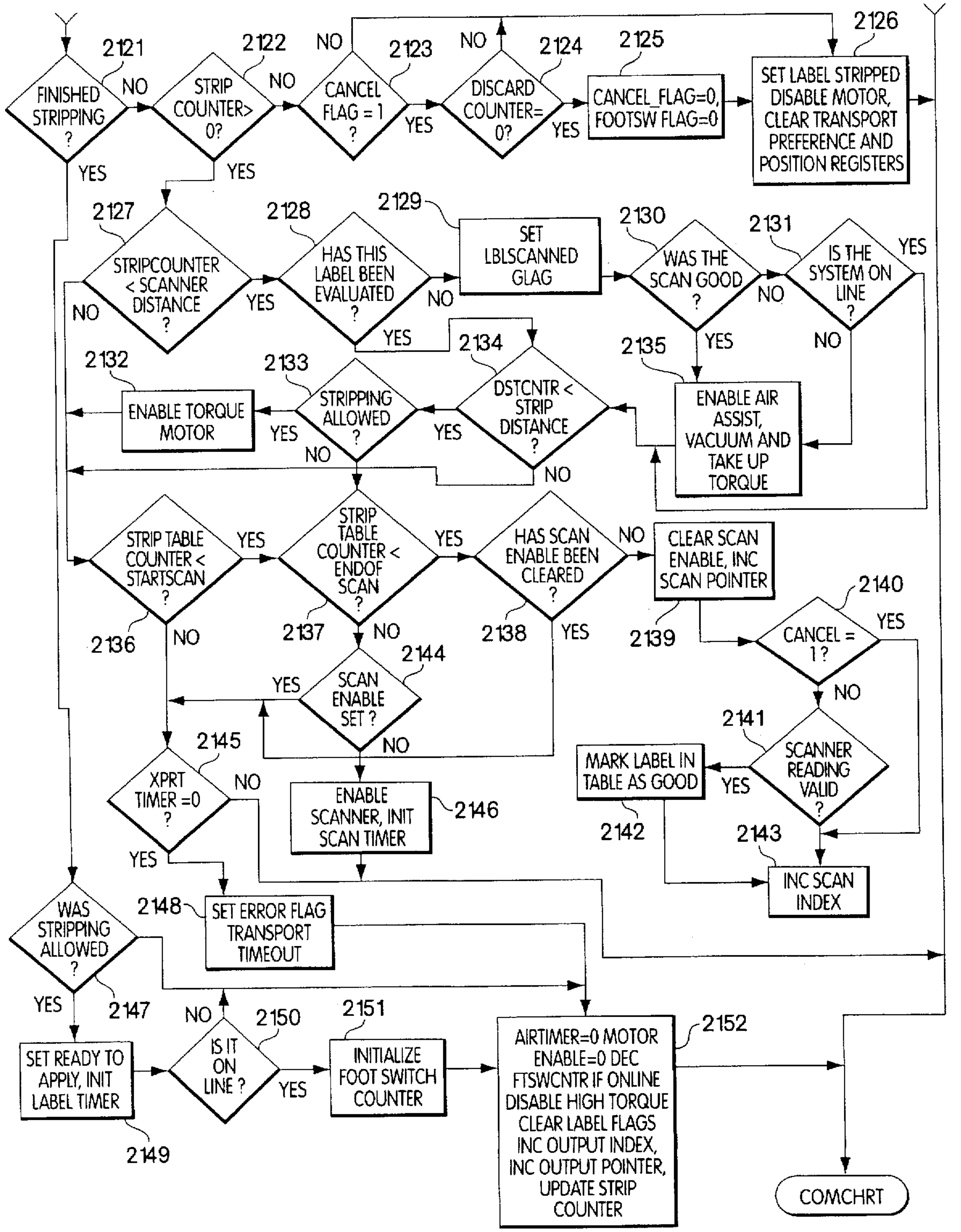

As shown in FIG. 7D, the strip chart (STRPCHRT 2100) is the portion of the program that controls the operation of the transport and the scanner. The program first determines in step 2101 if the label sensor sees an out of stock condition. If so, the program determines in step 2102 if this condition has been recognized by testing for the out of stock flag. If set, it exits the chart. If not set, in step 2103 it sets this flag, clears the motor enable flag, sets the transport position and reference registers to zero, clears all the control flags, increments the label input index and sets the label output index equal to the input value, increments the strip counter input pointer and sets the strip counter output and scan pointers to this value whereupon it exits from the chart. If step 2101 determines stock to be available, in step 2104 the program determines if a label is currently being stripped (label sequence flag). If not, the program then determines in step 2105 if the motor control flag is enabled. If not, the program determines in steps 2106 and 2107 if the applicator is running or if the cover interlock switches are open, respectively. If either is true, it exits the chart. Otherwise, it determines in step 2108 if power just came up or if there are any error conditions. If so, it tests, in step 2109, for the operation of the CLEAR switch, a front panel control. If not, it exits the chart. If so, in step 2110, it clears all error and power up flags, sets the system status to Off Line, applies low torque to the takeup motor and outputs the Off Line message on the operator display. It then exits the chart. If step 2108 determines there to be no error conditions, step 2111 determines if the system is On Line or Off Line. If Off Line, step 2117 determines if the STRIP switch, a front panel control, is operated. If not, it exits the chart. If so, it advances to step 2115 described below. If step 2111 determines the system to be On Line, then in step 2112 the program determines if the foot switch flag is set. If not set, the program determines in step 2113 if the foot switch is operated. The foot switch is an external switch interfaced to the system used by an operator to index a label through the system onto the apply head and thence to apply it to an article to be labelled. As the name implies, the switch is operated by the operator's foot in order to keep both hands free for handling articles to be labelled. If the foot switch is not currently actuated, the program exits the chart, else in step 2114 it sets the foot switch flag and initializes the foot switch counter to a preset value. The program then advances to step 2115 where it enables the strip sequence by setting the motor and control flags, applying low torque to the takeup motor and starting a timer. The foot switch flag serves to tell the program in the prior step 2112 if the foot switch had previously been depressed. The foot switch counter is a counter that is decremented each time a label passes the strip point but is rejected to waste because of bad scan data. Once the flag is set, it will remain set and a strip sequence will be undertaken until a valid label is stripped and applied or until the foot switch counter goes to zero. If in step 2112 it is determined that the foot switch flag is set, then in step 2116 the foot switch counter is checked for countdown. If greater than zero, then the program advances to step 2115 to execute another strip sequence. If the counter is zero, then the program advances to step 2118 where the foot switch flag is cleared, thus requiring a separate operation of the foot switch at a later point to initialize a new stripping set.

Once the motor control flag is set, then step 2105 detects this condition and in step 2119 determines if the timer set in step 2115 has expired. If not, the program exits; if so then in step 2120 the program enables the transport servo motor, initializes the transport watchdog timer and sets the label sequence flag. When step 2104 detects that the label sequence flag has been set, it tests in step 2121 if the strip sequence is completed. If not, in step 2122 it tests if the strip counter is still above zero. If so, in step 2127 it tests if the strip counter is below the distance from the scanner to the strip point. If so, in step 2128 it determines if the present label has already been evaluated by testing in step 2128 the label scanned flag. If the flag is set, it advances directly to step 2134. If the label scanned flag is not set, in step 2129 it sets it and then in step 2130 tests the good scan bit for this label in the label table. If the bit is valid, it advances to step 2135 where it enables the air assist and vacuum systems and sets the enable torque system bit, following which it advances to step 2134. If in step 2130 the program finds the good scan bit to be reset, it then tests in step 2131 if the system is on line. If not it advances to step 2135 to enable stripping, and if the system is on line, it advances to step 2134. In this manner, stripping is always enabled when off line but only enabled when on line if the label to be stripped has been successfully scanned. In step 2134, the strip counter is tested to see if it has come down to the value to initialize stripping. If not the program advances to step 2136. If so, the program tests to see if the torque system has been enabled, at step 2133. If not, it advances to step 2136. If so, it applies full torque to the take up motor, at step 2132. In step 2136, the program tests to see if the counter in the strip table indexed by the scan pointer is below the value for starting the scanner. If not, it advances to step 2145. If so, it tests in step 2137 if this counter is below the value to end the scan sequence. If not, in step 2144 it tests if the scanner has been enabled. If not, it enables the scanner in step 2146 and then exits the chart. If so the program advances to step 2145. If the result of step 2137 is that the strip table counter is below the stop scan distance, the program tests in step 2138 if the scanner is still enabled. If not, it advances to step 2145, else in step 2139 it clears the scan enable line. In step 2140, it tests if the cancel function is enabled. The cancel function is a control state initialized in the COMCHRT (2300) in response to an ASCII control character (CAN=018H). This character instructs the system to bypass a fixed length of stock controlled by a discard counter. The discard counter is counted down in the interrupt handler by motion of label stock. The software implements this bypass function by not testing and marking the good scan bit. Step 2140 advances to step 2143 if the cancel function is enabled. If cancel is not enabled, in step 2141 the program tests the scanner for a valid reading. If good, it marks the label in the table indexed by the scan pointer as good, at step 2142. In step 2143, it increments the label table scan pointer and the strip table counter pointer and exits the chart. In step 2145, the program tests the transport timer for timeout. This timer is a watchdog used to test for error conditions. If still running (timer≠0), the program exits the chart. If timed out, at 2148, it sets an error flag indicating transport timeout, issues an alarm message, takes the system off line and advances to step 2152.

If in step 2122 it is determined that the strip counter has counted down to zero, then in step 2123 it tests the cancel flag. If clear it advances to step 2126, else it tests the discard counter. If the discard counter is still above zero, it advances to step 2126, else in step 2125 it clears the discard counter and sets the foot switch flag to zero. It advances to step 2126 where it sets the label stripped flag, disables the torque motor, resets the transport reference and position registers and exits the chart.

In step 2121, when the program determines that the label stripped flag has been set, it advances to step 2147 where it determines if stripping was allowed (torque motor system enabled). If not, it advances to step 2152, else in step 2149 it sets a ready to apply status line. In step 2150 the program tests if the system is on line, and, if so, in step 2151 it re-initializes the foot switch counter. In step 2152, it clears the motor enable, decrements the foot switch counter, clears the various label control flags, resets the takeup motor to low torque, increments the strip counter table and label table output pointers and adds the label length indexed by the label table output pointer to the strip counter. The program then exits the chart.

Modifications and substitutions of the present invention by one of ordinary skill in the art are within the scope of the present invention which is not to be limited, except by the claims which follow.

What is claimed is:

1. A method for selectively removing labels having a leading edge, a trailing edge, a first planar side retained to an elongated carrier web and a second exposed surface, comprising the steps of:

determining if a label on said web is acceptable for labeling;

moving said web having a label determined to be acceptable for labelling thereon over an edge having a first radius;

selectively applying a tension to said web to cause said web to conform to said first radius to urge the separation of said labeling edge of said label determined to be acceptable for labeling;

selectively applying a fluid to said label to further urge the separation of said label determined to be acceptable for labelling from said web, whereon said selectively applied tension and said selectively applied fluid causes said label to become separated from said web; and moving said web over said edge without applying said tension for all other labels not determined to be acceptable for labelling, wherein said labels not selected remain attached to said web and are removed as said web moves away from said edge.

2. The method of claim 1, wherein said applied fluid comprises a positive air pressure applied to said first surface of said label.

3. The method of claim 2, further including the steps of:

moving said selected label in contact with a label carrier as said web is moved over said edge, wherein said carrier web initially moves over said first surface, said label carrier having a receiving surface which is disposed in relation to the plane of said first surface of said edge a distance less than the thickness of said web and said label; and selectively applying a negative air pressure between said selected label and said receiving surface of said label carrier.

4. The method of claim 3, further including the step of pivoting said label about an axis substantially parallel to said edge, wherein said positive and said negative air pressure applies a rotational force about said axis.

5. The method of claim 4, wherein said rotational force causes said trailing edge to advance past said web.

6. A method of selectively removing a label from an elongated carrier web, comprising the steps of:

moving said web having a label thereon over an edge having a first radius and comprising a top and a side surface having an angle therebetween wherein said angle is sufficient to cause a leading edge of said label to separate from said web;

selectively applying a tension to said web to cause said web to conform to said first radius;

selectively angularly positioning said label relative to said web at said edge to cause separation of a trailing edge of said label to separate from said web.

7. The method of claim 6, wherein said step of angularly positioning comprises the step of applying to said label a rotational moment about an axis parallel to said edge.

8. The method of claim 7, wherein said step of providing a rotational moment comprises the steps of providing a rotational force on the label closer to the leading edge of said label, and providing a pivot means between said web and said rotational force as applied to said label, and parallel to said edge and separated from said web.

9. The method of claim 8, wherein said step of providing a pivot means comprises the step of providing a label carrier having a label receiving surface having a region proximal to said edge, said region being confronting and laterally offset from said edge top surface, wherein the outer surface of an attached label at said edge is disposed sufficiently above said portion and into said label receiver to cause said label when in contact therewith, to diverge from the remaining label receiving surface as said label is moved over said edge.

10. The method of claim 9, wherein the step of providing a rotational force comprises the step of applying a force on said diverging label toward said label receiving surface.

* * * * *